(12) United States Patent
Schulz

(10) Patent No.: US 11,486,505 B2
(45) Date of Patent: Nov. 1, 2022

(54) PLATE VALVE AND METHOD FOR OPERATING SAME

(71) Applicant: BURCKHARDT COMPRESSION AG, Winterthur (CH)

(72) Inventor: Reiner Schulz, Lottstetten (DE)

(73) Assignee: BURCKHARDT COMPRESSION AG, Winterthur (CH)

( * ) Notice: Subject to any disclaimer, the term of this patent is extended or adjusted under 35 U.S.C. 154(b) by 246 days.

(21) Appl. No.: 16/978,996

(22) PCT Filed: Mar. 8, 2019

(86) PCT No.: PCT/EP2019/055895
§ 371 (c)(1),
(2) Date: Sep. 8, 2020

(87) PCT Pub. No.: WO2019/170883
PCT Pub. Date: Sep. 12, 2019

(65) Prior Publication Data
US 2021/0025508 A1    Jan. 28, 2021

(30) Foreign Application Priority Data
Mar. 8, 2018 (EP) ..................................... 18160798

(51) Int. Cl.
*F16K 15/02* (2006.01)
*F16K 25/04* (2006.01)

(52) U.S. Cl.
CPC ............ *F16K 15/023* (2013.01); *F16K 25/04* (2013.01); *Y10T 137/786* (2015.04);
(Continued)

(58) Field of Classification Search
CPC .. F16K 15/023; F16K 25/04; Y10T 137/7839; Y10T 137/7859; Y10T 137/786; Y10T 137/7861
See application file for complete search history.

(56) References Cited

U.S. PATENT DOCUMENTS

| 1,385,147 A | * | 7/1921 | Prellwitz | ................. F16K 15/10 |
| | | | | 137/516.13 |
| 1,413,059 A | * | 4/1922 | Riesner | ................... F16K 15/16 |
| | | | | 137/512.1 |

(Continued)

FOREIGN PATENT DOCUMENTS

| DE | 687507 C | 1/1940 |
| DE | 1231984 B | 1/1967 |

(Continued)

OTHER PUBLICATIONS

International Search Report dated Apr. 10, 2019 in PCT/EP2019/055895, 5 pages.

*Primary Examiner* — Daphne M Barry
*Assistant Examiner* — Frederick D Soski
(74) *Attorney, Agent, or Firm* — Brooks Kushman P.C.

(57) ABSTRACT

An automatic plate valve having a valve seat, a valve guard, a longitudinal axis (L) and a valve element arranged between the valve seat and the valve guard and movable along the longitudinal axis (L). The valve seat includes an end face having with valve seat openings oriented towards the valve guard, and a plurality of passages, which have a fluid-conducting connection to the valve seat openings. The valve element includes sealing element interacting with the valve seat openings. Wherein some of the passages have a different distance to the longitudinal axis in a radial direction (R). The end face of the valve seat including a plurality of grooved recesses, forming valve seat openings, with passages open into the same recess, the passages forming a fluid-conducting connection to the valve seat opening. Some of these passages connected to the valve seat opening have different distances to the longitudinal axis.

18 Claims, 5 Drawing Sheets

(52) U.S. Cl.
CPC .... *Y10T 137/7839* (2015.04); *Y10T 137/7859* (2015.04); *Y10T 137/7861* (2015.04)

(56) References Cited

U.S. PATENT DOCUMENTS

| | | | | |
|---|---|---|---|---|
| 1,444,790 A * | 2/1923 | Holman | ............... | F16K 15/10 137/516.13 |
| 1,475,826 A * | 11/1923 | Hoffman | ............... | F16K 15/08 137/512.1 |
| 1,481,691 A * | 1/1924 | Chew | ............... | F25B 31/00 29/213.1 |
| 1,503,271 A * | 7/1924 | Leinert | ............... | F16K 15/10 137/516.13 |
| 1,529,439 A * | 3/1925 | Leinert | ............... | F16K 15/10 137/516.13 |
| 1,677,717 A * | 7/1928 | Huff | ............... | F16K 15/035 137/856 |
| 1,695,069 A * | 12/1928 | Tuttle | ............... | F16K 15/12 137/516.13 |
| 1,890,051 A * | 12/1932 | Gehres | ............... | F16K 15/00 137/454.4 |
| 1,909,974 A * | 5/1933 | Longacre | ............... | F16K 15/10 137/516.21 |
| 1,971,171 A * | 8/1934 | Bebbington | ............... | F16K 15/10 137/516.13 |
| 2,186,489 A * | 1/1940 | Kehler | ............... | F16K 15/10 137/516.13 |
| 2,624,587 A * | 1/1953 | Watson | ............... | F16K 15/063 137/538 |
| 2,703,102 A * | 3/1955 | Neugebauer | ............... | F04B 39/1053 137/512.1 |
| 2,703,583 A * | 3/1955 | Seligman | ............... | F04B 39/1053 137/516.21 |
| 2,957,620 A * | 10/1960 | Turnwald | ............... | F04B 49/03 417/454 |
| 3,134,399 A * | 5/1964 | Deminger | ............... | F16K 15/10 137/512.1 |
| 3,158,175 A * | 11/1964 | Jaklitsch | ............... | F04B 39/1033 417/559 |
| 3,286,727 A * | 11/1966 | Kehler | ............... | F16K 15/08 137/516.13 |
| 3,292,848 A * | 12/1966 | Kehler | ............... | F04B 39/1053 137/516.13 |
| 3,358,710 A * | 12/1967 | Page | ............... | F04B 39/1053 137/533.27 |
| 3,360,006 A | 12/1967 | Kehler | | |
| 3,369,563 A * | 2/1968 | Deminger | ............... | F16K 15/08 137/512.1 |
| 3,536,094 A * | 10/1970 | Manley, Jr. | ............... | F16K 15/08 137/512.1 |
| 3,703,912 A * | 11/1972 | Bauer | ............... | F16K 15/08 137/514 |
| 3,792,718 A * | 2/1974 | Kohler | ............... | F04B 39/1053 137/516.19 |
| 3,875,962 A * | 4/1975 | Bauer | ............... | F04B 39/1053 137/516.21 |
| 3,903,921 A * | 9/1975 | Brookman | ............... | F16K 15/10 137/516.13 |
| 3,945,397 A * | 3/1976 | Riedel | ............... | F04B 39/10 137/514 |
| 4,036,251 A * | 7/1977 | Hartwick | ............... | F04B 39/1066 137/527 |
| 4,039,002 A * | 8/1977 | Broyan | ............... | F04B 39/108 137/516.17 |
| 4,164,238 A * | 8/1979 | Riedel | ............... | F04B 39/1053 137/516.25 |
| 4,184,508 A * | 1/1980 | Mayer | ............... | F04B 39/1053 137/512.1 |
| 4,184,818 A * | 1/1980 | Petrovsky | ............... | F16K 15/08 137/516.13 |
| 4,196,746 A * | 4/1980 | Broyan | ............... | F04B 39/108 137/516.17 |
| 4,231,394 A * | 11/1980 | Hrabal | ............... | F16K 15/16 137/516.13 |
| 4,278,106 A * | 7/1981 | Cunningham | ............... | F04B 39/1033 137/516.13 |
| 4,299,250 A * | 11/1981 | Happe | ............... | G05D 16/0622 137/859 |
| 4,307,751 A * | 12/1981 | Mayer | ............... | F16K 15/08 137/516.13 |
| 4,398,559 A * | 8/1983 | Bunn | ............... | F16K 17/0413 137/540 |
| 4,402,342 A * | 9/1983 | Paget | ............... | F16K 15/16 137/516.13 |
| 4,483,363 A * | 11/1984 | Madoche | ............... | F04B 39/1033 137/329.04 |
| 4,516,602 A * | 5/1985 | Ludenbach | ............... | F04B 39/1053 137/516.13 |
| 4,526,195 A * | 7/1985 | Humphrey | ............... | F16K 15/00 428/113 |
| 4,570,666 A * | 2/1986 | Hartshorn | ............... | F16K 15/10 137/512.1 |
| 4,627,464 A * | 12/1986 | Hartshorn | ............... | F04B 39/1053 137/516.21 |
| 4,632,145 A * | 12/1986 | Machu | ............... | F04B 49/243 137/516.21 |
| 4,643,220 A * | 2/1987 | Hartshorn | ............... | F04B 39/1053 137/516.21 |
| 4,703,772 A * | 11/1987 | Ostermann | ............... | F16K 15/16 137/516.21 |
| 4,723,572 A * | 2/1988 | Tuymer | ............... | F04B 39/1053 137/516.21 |
| 4,852,608 A * | 8/1989 | Bennitt | ............... | F04B 39/1053 137/516.13 |
| 4,854,341 A * | 8/1989 | Bauer | ............... | F04B 39/1053 137/516.21 |
| 4,856,558 A * | 8/1989 | Kardos | ............... | F02M 21/0233 137/625.33 |
| 4,869,289 A * | 9/1989 | Hrabal | ............... | F16K 15/16 137/512.1 |
| 4,869,291 A * | 9/1989 | Hrabal | ............... | F04B 39/1053 137/516.21 |
| 4,889,156 A * | 12/1989 | Woolatt | ............... | F16K 15/12 137/516.21 |
| 4,913,187 A * | 4/1990 | Woollatt | ............... | F16K 15/12 137/516.21 |
| 4,924,906 A * | 5/1990 | Hrabal | ............... | F04B 39/1033 137/512.1 |
| 4,945,946 A * | 8/1990 | Gangloff | ............... | F04B 39/1033 137/516.13 |
| 4,951,706 A * | 8/1990 | Kardos | ............... | F16K 15/10 137/516.13 |
| 4,984,361 A * | 1/1991 | Woollatt | ............... | B29C 45/00 29/890.126 |
| 5,052,434 A * | 10/1991 | Bauer | ............... | F16K 15/08 137/516.13 |
| 5,311,902 A * | 5/1994 | Overfield | ............... | F04B 39/10 137/516.13 |
| 5,483,992 A * | 1/1996 | Lehmann | ............... | F04B 39/1033 137/516.21 |
| 5,511,583 A * | 4/1996 | Bassett | ............... | F04B 39/1033 137/512.1 |
| 5,634,492 A * | 6/1997 | Steinruck | ............... | F04B 49/243 137/512.1 |
| 5,642,753 A * | 7/1997 | Thistle | ............... | F04B 49/243 417/446 |
| 5,678,603 A * | 10/1997 | Tschop | ............... | F16K 15/08 137/512.1 |
| 6,149,400 A * | 11/2000 | Samland | ............... | F04B 39/08 137/516.13 |
| 6,510,868 B2 * | 1/2003 | Penza | ............... | F04B 39/1033 137/516.21 |
| 6,539,974 B2 * | 4/2003 | Steinruck | ............... | F04B 39/1033 137/512.1 |
| 7,540,301 B2 * | 6/2009 | Tuymer | ............... | F04B 39/1053 137/516.21 |
| 8,281,805 B2 * | 10/2012 | Spiegl | ............... | F04B 39/1053 137/516.11 |

(56) References Cited

U.S. PATENT DOCUMENTS

| | | | | |
|---|---|---|---|---|
| 8,500,420 B2* | 8/2013 | Spiegl | F04B 39/08 | |
| | | | 417/446 | |
| 8,662,105 B2* | 3/2014 | Lagler | F16K 15/08 | |
| | | | 137/516.21 | |
| 9,115,794 B2* | 8/2015 | Vanderzyden | F02C 7/32 | |
| 9,309,878 B2* | 4/2016 | Columpsi | F16K 27/0209 | |
| 9,702,353 B2* | 7/2017 | Spiegl | F16K 15/10 | |
| 9,765,770 B2* | 9/2017 | Babbini | F16K 15/08 | |
| 10,145,480 B2* | 12/2018 | Buffa | F16K 15/10 | |
| 10,215,295 B2* | 2/2019 | Babbini | F04B 49/225 | |
| 10,859,078 B2* | 12/2020 | Schulz | F04B 39/1013 | |
| 10,875,220 B2* | 12/2020 | Spiegl | B29C 45/0046 | |
| 11,041,572 B2* | 6/2021 | Fujinami | F16K 15/12 | |
| 11,293,556 B2* | 4/2022 | Tozzi | F04B 39/1053 | |
| 11,370,151 B2* | 6/2022 | Spiegl | B29C 45/0025 | |
| 2002/0002997 A1* | 1/2002 | Steinruck | F04B 39/1033 | |
| | | | 137/516.11 | |
| 2002/0144733 A1* | 10/2002 | Artner | F04B 39/1053 | |
| | | | 137/512.1 | |
| 2004/0016459 A1* | 1/2004 | Thompson | F16K 27/003 | |
| | | | 137/512.1 | |
| 2006/0180208 A1* | 8/2006 | Walpole | F16K 31/084 | |
| | | | 137/528 | |
| 2008/0149196 A1* | 6/2008 | Spiegl | F04B 39/1066 | |
| | | | 137/543.15 | |
| 2008/0156381 A1* | 7/2008 | Tuymer | F16K 15/08 | |
| | | | 137/512.1 | |
| 2008/0230733 A1* | 9/2008 | Spiegl | F04B 39/1053 | |
| | | | 251/333 | |
| 2012/0152379 A1* | 6/2012 | Lagler | F16K 15/08 | |
| | | | 137/511 | |
| 2015/0075650 A1* | 3/2015 | Spiegl | F04B 39/1053 | |
| | | | 137/516.15 | |
| 2015/0204319 A1* | 7/2015 | Columpsi | F16K 15/026 | |
| | | | 417/559 | |
| 2018/0298890 A1* | 10/2018 | Schulz | F04B 39/1013 | |
| 2018/0306176 A1* | 10/2018 | Schulz | F16K 15/026 | |
| 2020/0063729 A1* | 2/2020 | Schulz | F16K 15/066 | |
| 2021/0356049 A1* | 11/2021 | Pfister | F16K 15/10 | |
| 2021/0388824 A1* | 12/2021 | Voser | F04B 5/02 | |

FOREIGN PATENT DOCUMENTS

| | | |
|---|---|---|
| DE | 2632162 A1 | 12/1977 |
| EP | 0300989 A1 | 1/1989 |
| GB | 191306450 A | 4/1914 |
| GB | 815186 A | 6/1959 |

* cited by examiner

PLATE VALVE AND METHOD FOR OPERATING SAME

CROSS-REFERENCE TO RELATED APPLICATION

This application is the U.S. national phase of PCT Application No. PCT/EP2019/055895 filed on Mar. 8, 2019, which claims priority to EP Patent Application No. 18160798.7 filed on Mar. 8, 2018, the disclosures of which are incorporated in their entirety by reference herein.

DESCRIPTION

The invention relates to an automatic plate valve and to a method for operating it.

PRIOR ART

EP 0300989A1 discloses an automatic plate valve for a compressor. This valve has the disadvantage that more severe wear occurs during operation, particularly when a pressure differential to be sealed off exceeds a value of 100 bar.

DESCRIPTION OF THE INVENTION

The object of the invention is to design a more advantageous plate valve which has a low degree of wear, particularly even where high pressure differentials have to be sealed off.

This object is achieved by a plate valve having the features of claim 1. The dependent claims 2 to 16 relate to further, advantageous embodiments. The object is further achieved by a method for operating an automatic plate valve having the features of claim 17.

The object is achieved in particular by an automatic plate valve comprising a valve seat, a valve guard, a longitudinal axis and a valve element arranged between the valve seat and the valve guard and movable back and forth in the direction of the longitudinal axis, wherein the valve seat comprises an end face having a plurality of valve seat openings oriented towards the valve guard, wherein the valve seat comprises a plurality of passages which have a fluid-conducting connection to the valve seat openings, wherein the valve element comprises at least one sealing element which has a sealing interaction with the valve seat openings, and wherein at least some of the passages have a different distance to the longitudinal axis in a radial direction to the longitudinal axis, wherein the end face of the valve seat comprises a plurality of preferably grooved recesses, which form the valve seat openings on the end face, wherein a plurality of passages open into the same recesses, wherein a plurality of passages have a fluid-conducting connection to the same valve seat opening via the respective recess, and wherein at least some of these passages having a fluid-conducting connection to the same valve seat opening have different distances to the longitudinal axis.

The object is further achieved in particular by a method for operating an automatic plate valve comprising a valve seat, a valve guard, a longitudinal axis and a valve element arranged between the valve seat and the valve guard and movable back and forth in the direction of the longitudinal axis, wherein the valve seat comprises a plurality of valve seat openings on its end face, wherein the valve seat openings are opened and closed by the movable valve element, wherein a fluid is delivered to the valve seat openings via a plurality of passages running in the valve seat, wherein the end face of the valve seat comprises a plurality of grooved recesses, which form the valve seat openings on the end face, wherein a fluid is delivered to the valve seat openings via a plurality of passages running in the valve seat and then via the recesses, and wherein the fluid is delivered to a respective recess and then to a respective valve seat opening bilaterally through separate passages spaced in a radial direction relative to the longitudinal axis.

The plate valve according to the invention is especially suitable for piston compressors. The plate valve is also suitable for other applications, however, for example as a check valve in a process engineering plant or in combination with a pump. It has been shown that in an automatically functioning plate valve used in piston compressors the valve element very rarely impinges flat on the valve seat. The wear occurring in the plate valve is therefore caused not so much by the mean surface unit pressure between the valve seat and the valve element but much more by the edge pressures between the moving valve element and the fixed seat face of the valve seat. It has emerged that reducing the nominal surface unit pressure by widening the seating surface on the valve seat does not necessarily lead to a reduced edge pressure. In contrast to known designs, the edge pressure in the case of the plate valve according to the invention is reduced by distributing the force resulting from the pressure differential over a larger overall length of the sealing edges. This larger overall length of the sealing edges is achieved by having a larger number of openings, that is to say the available cross section or the overall outlet area available is spread over a greater number of smaller openings, so that the ratio of edge length to cross section varies, particularly in one exemplary embodiment in which the length of the valve seat openings running in a circumferential direction is maintained, and the radial gap width or the cross section of the valve seat opening running in a circumferential direction is reduced. Each sealing element has an edge which is capable of impinging on the valve seat. The narrower valve seat openings compared to known plate valves, and the greater number of sealing elements with corresponding edges means that the edge pressure acting on the valve seat is reduced. The edge pressure is reduced because, for a given valve at the given pressure differential, the force acting on the valve plate is distributed over a greater length of the edges, i.e. the edge pressure is inversely proportional to the length of the edges. For piston compressors the maximum diameter of a plate valve is usually predefined, so that an increase in the overall length of the edges of the valve element can be achieved by designing the sealing elements narrower in a radial direction, in order to thereby arrange additional sealing elements in the valve element, which in turn means that the valve seat openings arranged in the valve seat have to be designed narrower, at least in a radial direction, preferably as narrow slots with a width, for example, of 1 mm to 8 mm, so that the valve seat comprises a plurality of between 2 and 20 valve seat openings, for example.

In an advantageously embodied plate valve, the ratio of the maximum valve element lift to the valve seat opening width is approximately 0.5 or 0.6. Owing to the small gap width of, for example, 1 mm to a maximum of 5 mm, the plate valve according to the invention therefore also has a small valve element lift, which affords the advantage that owing to the small lift the wear occurring on the plate valve is further reduced.

The end face of the valve seat comprises a plurality of grooved recesses, which form the valve seat openings on the end face, wherein each grooved recess forms a valve seat opening. A plurality of passages each open into the same grooved recess. In order to supply each grooved recess and the corresponding valve seat opening predefined by the grooved recess with a sufficient quantity of fluid, and to keep the fluid conduction resistance inside the valve seat within bounds, a plurality of passages are arranged are in the valve seat, wherein at least some of the passages have a different distance to the longitudinal axis in a radial direction to the longitudinal axis, wherein a plurality of these passages have a fluid-conducting connection to the same recess and thereby to the same valve seat opening, that at least some of these passages having a fluid-conducting connection to the same valve seat opening have different distances to the longitudinal axis. This arrangement also allows a narrow valve seat opening to be supplied with sufficient fluid.

In an especially advantageous embodiment, the end face of the valve seat comprises a plurality of preferably grooved recesses, which form the valve seat openings on the end face, wherein the passages open into the recesses. This embodiment has the advantage that the recesses define the course of the valve seat openings on the end face, whereas the passages are arranged running in the valve seat in such a variety of possible forms that the passages have fluid-conducting connections to the recesses. Thus, the passages, can open into the same recess at least two different points in a radial direction relative to the longitudinal axis, both on an outer side of the recess relative to the longitudinal axis, and on an inner side of the recess relative to the longitudinal axis. A recess can therefore be supplied with fluid bilaterally in a radial direction relative to the longitudinal axis or at different points in a radial direction. The passages may furthermore also have different diameters. The passages preferably run parallel to the longitudinal axis, wherein the passages are more advantageously designed as bores.

The plate valve according to the invention has the advantage that the shape and/or the course of the recesses can be designed in multiple possible ways or with a variety of shapes and courses, so that the course of the valve seat openings can also be configured in multiple different shapes. The grooved recesses and thereby also the valve seat openings may also run or be configured, for example, in a circular, annular, annular segmental, circular segmental, radial, zigzag or some other shape. The proviso is that the recesses defining the course of the valve seat openings be connected to passages, and that the sealing element assigned to each valve seat opening be matched to the course of the valve seat opening, in order to afford a sealing interaction with the respective valve seat opening. This combination of passages and grooved recesses allows valve seat openings to be designed with a variety of possible courses.

The plate valve according to the invention comprises a multiplicity of passages via which a fluid is then delivered to the recesses and thereafter to the valve seat openings. At least one outer passage and at least one inner passage is preferably provided for each recess and valve seat opening, the passages opening bilaterally into the same recess forming the valve seat opening in a radial direction to the longitudinal axis, in order to supply the preferably narrow valve seat opening with sufficient fluid, and to keep any flow loss or pressure loss on the valve seat opening and the ducting through the passage low and preferably negligibly small. This is important particularly when a differential pressure of more than 100 bar to 200 bar occurs over the valve seat. A plurality of outer and inner passages are preferably arranged spaced at intervals from one another in a circumferential direction, wherein these open bilaterally into the grooved recess. The plate valve according to the invention has the advantage that it can be operated with little wear and with a low internal pressure drop, even under high pressure.

The plate valve according to the invention has the advantage that the fluid flowing through it is able to flow through the valve seat without any great restriction, despite the relatively narrow, grooved recesses forming the valve seat openings, since the grooved recesses are supplied with fluid from both sides in a radial direction, and since the passages of the valve seat delivering the fluid can have a larger, preferably a substantially larger diameter, for example a diameter at least twice the width of the valve seat openings. The passages preferably designed as bores may have different diameters, depending on the arrangement, in order, among other things, to reduce the flow resistance of the fluid in the passage.

The invention is described in detail below with reference to exemplary embodiments.

BRIEF DESCRIPTION OF THE FIGURES

The figures used to explain the exemplary embodiments show.

In the drawings, identical parts are basically provided with the same reference numerals.

WAYS OF CARRYING OUT THE INVENTION

Figure 1:
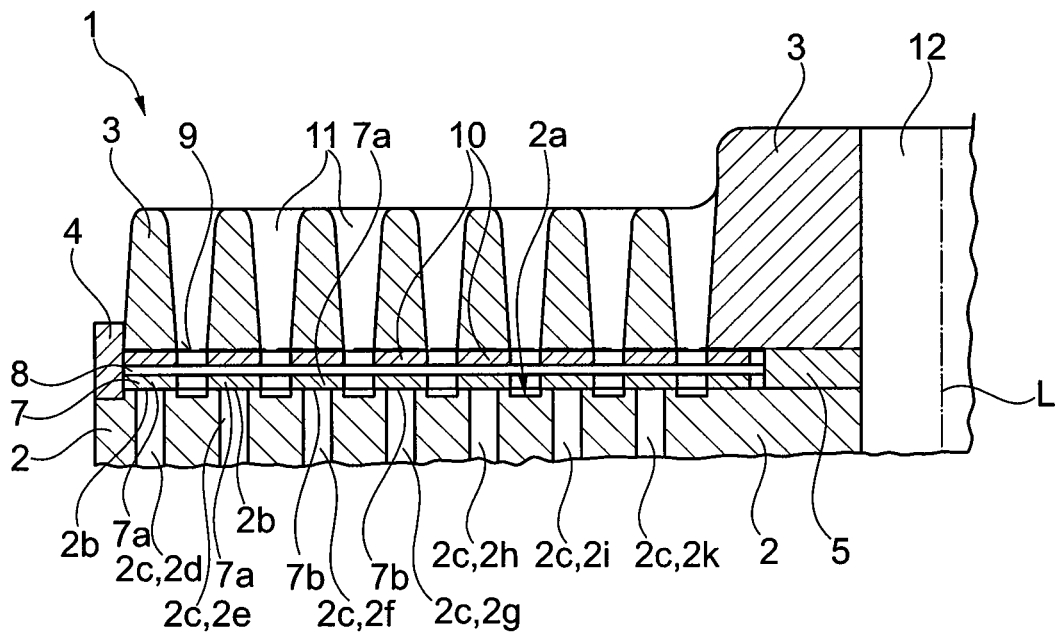
FIG. 1 a section through a first exemplary embodiment of a plate valve.
Figure 2:
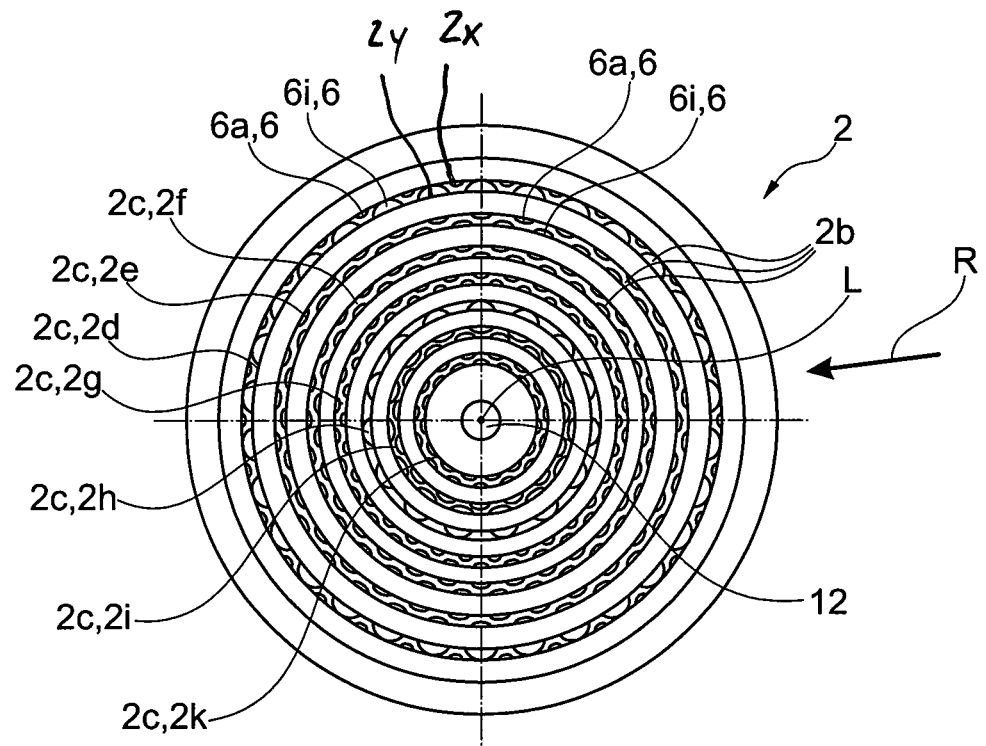
FIG. 2 a top view of a valve seat of the plate valve.
Figure 3:
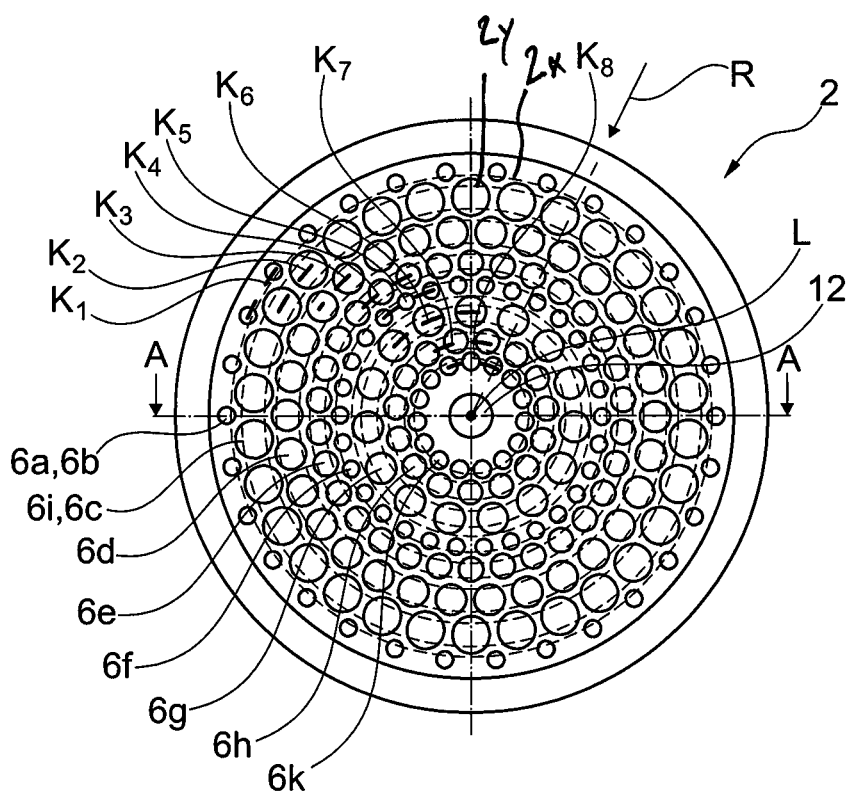
FIG. 3 a view of the valve seat according to FIG. 2 from below.
Figure 4:
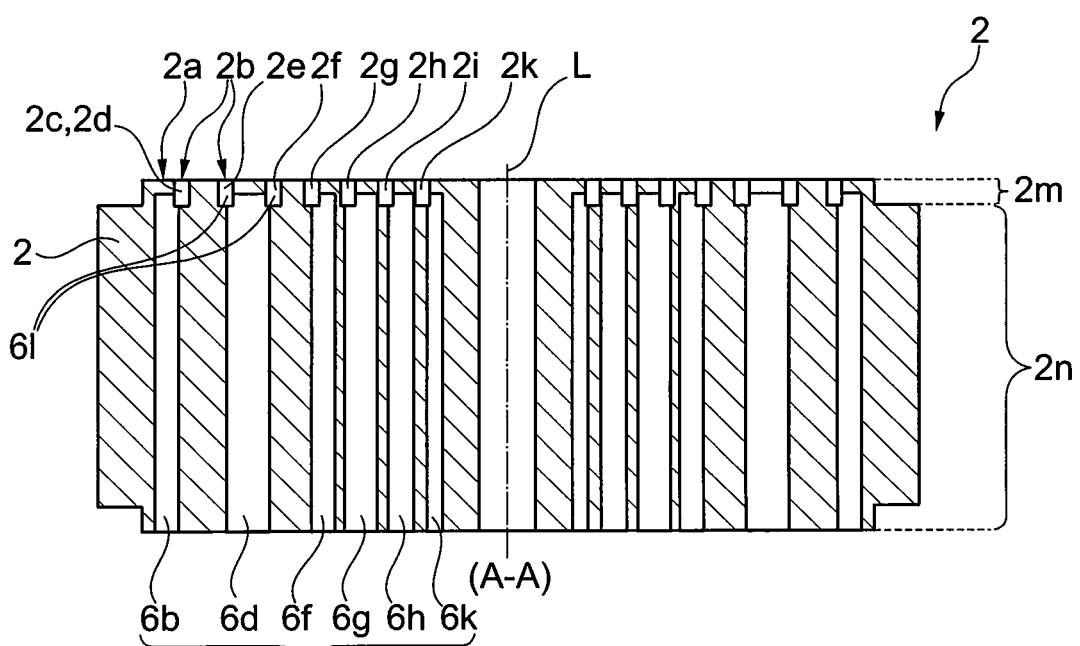
FIG. 4 a longitudinal section through the valve seat according to FIG. 3 along the section line A-A.
Figure 5:
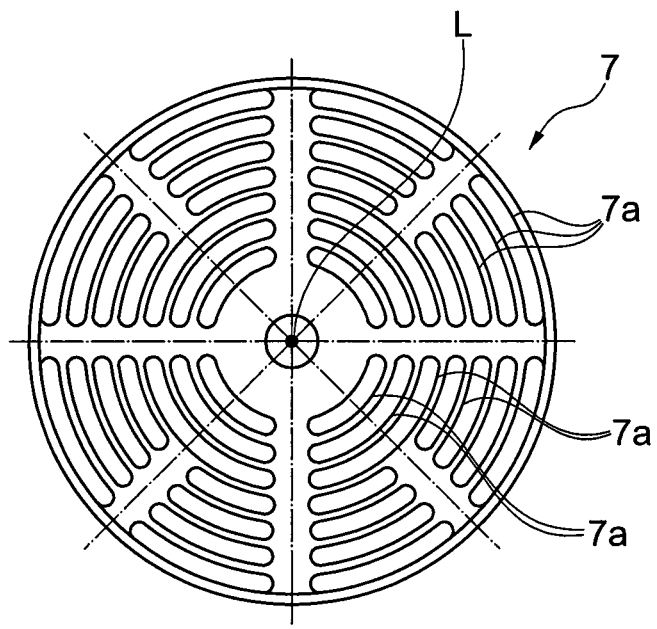
FIG. 5 a top view of a movable valve element.

FIG. 1 in a longitudinal section partially shows the upper part of a first exemplary embodiment of a plate valve 1. FIGS. 2, 3 and 4 show the valve seat 2 represented only partially in FIG. 1 in a top view, a view from below and a longitudinal section. FIG. 5 moreover shows a top view of the valve element 7 used in FIG. 1. The automatic, i.e. pressure-controlled plate valve 1 represented in FIGS. 1 to 5 comprises a valve seat 2, in which a plurality of grooved recesses 2c, 2e-2k, having a fluid-conducting connection to passages 6, 6a, 6i are arranged running concentrically with the longitudinal axis L. The grooved recesses 2c, 2e-2k form valve seat openings 2b on the end face 2a of the valve seat 2. The valve seat openings 2b are configured as annular areas running through 360°, which are closed and opened by the valve element 7 and its sealing elements 7a. The valve element 7 is designed as a slotted valve plate, and is preferably composed of metal, such as steel, or a plastic. The valve element 7 comprises sealing elements 7a running concentrically with the longitudinal axis L, which as represented in FIG. 1 are in portions designed running annularly and which interact with the valve seat openings 2b to form a seal. The valve lift of the valve element 7 is limited by a guard 3. The guard 3 comprises a stop face 9, and comprises a plurality of slotted discharge openings 11 running concentrically with the longitudinal axis L. The valve seat 2 and the guard 3 are preferably held together by a screw (not shown) running in the bore 12. In one advantageous embodiment the plate valve 1 furthermore comprises a spacer ring 5, a damper plate 10 and an outer edge 4.

The plate valve 1 shown may be used either as a suction valve or as a pressure valve, these two valves in principle having the same construction and differing from one another only in the arrangement of the guard 3 and the valve seat 2 in relation to the operating space.

The valve seat 2, as represented in FIGS. 1 to 4, preferably comprises a plurality of recesses 2c, which form the valve seat openings 2b on the end face 2a. The recesses 2c are preferably groove-shaped and designed to run concentrically with the longitudinal axis L, so that the valve seat openings 2b on the end face 2a likewise run concentrically with the longitudinal axis L. The valve seat 2 comprises a plurality of passages 6, which run in the direction of the longitudinal axis L and which have a fluid-conducting connection to respective recesses 2c and hence also a fluid-conducting connection to the valve seat openings 2b. As can be seen in particular from FIG. 2, each of the grooved recesses 2c, in a radial direction to the longitudinal axis L, is supplied with fluid via outer passages 6a and via inner passages 6i, which in each case both open into the same recess 2c, wherein the outer passages 6a and the inner passages 6i have a different distance to the longitudinal axis L, wherein the outer passages 6a open into the recess 2c on the outer side 2x, and wherein the inner passages 6i preferably or substantially open into the recess 2c on the inner side 2y.

The valve seat 2, as shown in FIG. 2, comprises seven grooved recesses 2c running concentrically with the longitudinal axis L, which form valve seat openings 2a, that is a first recess 2d, a second recess 2e, a third recess 2f, a fourth recess 2g, a fifth recess 2h, a sixth recess 2i and a seventh recess 2k. The valve seat 2, as shown in FIG. 3, comprises eight passages 6 running concentrically with the longitudinal axis L and in the direction of the longitudinal axis L, and spaced at regular intervals from one anther in the circumferential direction to the longitudinal axis L, which in a radial direction R from the outside towards the longitudinal axis L are referred to herein as the first passage 6b, second passage 6c, third passage 6d, fourth passage 6e, fifth passage 6f, sixth passage 6g, seventh passage 6h, and eighth passage 6k. As shown in FIGS. 2 and 3, respective outer passages 6a open into each of the recesses 2b to 2h and inner passages 6i bilaterally into the respective recesses 2c in a radial direction relative to the longitudinal axis L, wherein the outer passages 6a open into the respective recesses 2c towards the outer side 2x, relative to the longitudinal axis L, and the inner passage 6b opens towards the inner side 2y, relative to the longitudinal axis L. For the first recesses 2d, therefore, as can be seen from FIGS. 2 and 3, the first passage 6b forms the outer passage 6a and the second passage 6c forms the inner passage 6i. For the second recesses 2c, as can be seen from FIGS. 2 and 3, the second passage 6c accordingly forms the outer passage 6a and the third passage 6d forms the inner passage 6i. This arrangement is continued up to the seventh recesses 2h, where the seventh passage 6h forms the outer passage 6a and the eighth passage 6k forms the inner passage 6i.

Figure 6:
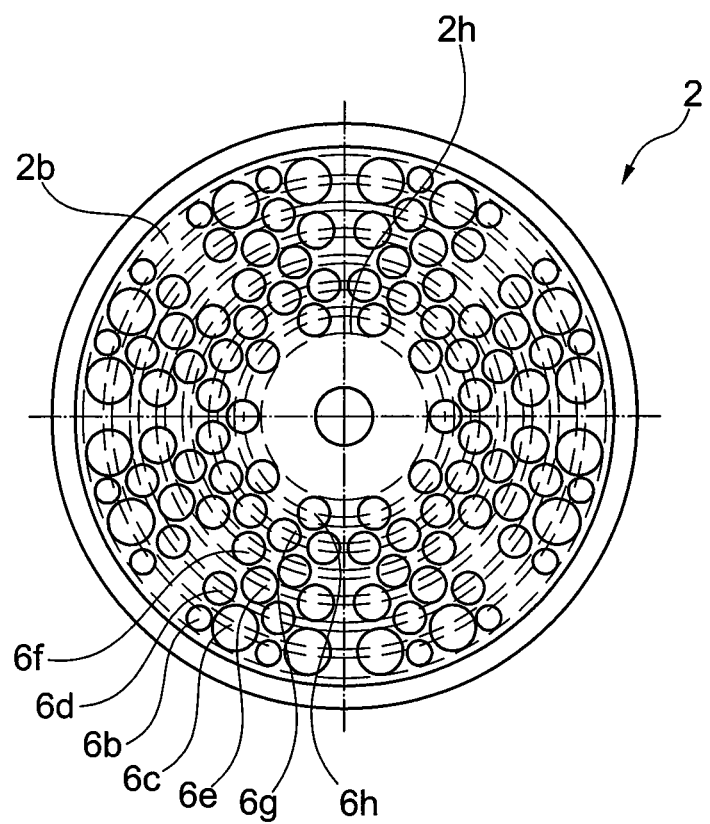
FIG. 6 a view of a further valve seat from below.

In a preferred embodiment a plurality of outer passages 6a and a plurality of inner passages 6i are arranged running in a circumferential direction concentrically with the longitudinal axis L, wherein these passages, as shown in FIG. 3, are advantageously arranged spaced at regular intervals from one anther in a circumferential direction, in each case along a circle K1 . . . K8 with the same distance to the longitudinal axis L. It may also prove advantageous, however, as shown in FIG. 6, to arrange the passages 6b, 6c, 6d, 6e, 6f, 6g, 6h spaced at differing intervals in a circumferential direction. This arrangement has the advantage that the valve seat is mechanically more stable in the area having no passages and the valve seat can thereby be designed thinner, which in the case of a pressure valve means that the clearance is finer or not as great. The passages are preferably omitted only in areas in which only a reduced flow would be to be expected anyway, for example due to restrictions by other parts such as the guard, for example, or the springs arranged in the guard.

The outer and inner passages 6a, 6i and preferably all passages 6, as represented in FIGS. 3 to 5, advantageously run in the direction of the longitudinal axis L or parallel to the longitudinal axis L. The outer passages 6a and the inner passages 6i and preferably all passages 6 are advantageously designed as bores, preferably as circular bores. The passages 6 could also have other shapes, however, for example a square shape.

Depending on its application and its diameter, the plate valve 1 according to the invention preferably comprises between three and 10 recesses 2c, which are preferably of grooved design, run concentrically with the longitudinal axis L and form the valve seat openings 2b. In one possible embodiment the valve seat 2 comprises at least three grooved recesses 2c: the first recesses 2d, the second recesses 2e and then the third recesses 2f, proceeding from the outside in a radial direction R towards the longitudinal axis L, wherein each grooved recess has a fluid-conducting connection to an outer passage 6a and an inner passage 6i, relative to the respective grooved recesses, preferably via passage openings 61 as represented in FIG. 4.

A passage 6, which has a fluid-conducting connection to both recesses of the respective pair 2b,2c and 2c,2d is advantageously arranged between each two pairs of recesses arranged in series in a radial direction R towards the longitudinal axis L, for example the pair of recesses 2d,2e or the pair of recesses 2e,2f, wherein this passage 6 simultaneously forms both the inner passage 6i of the recess 2d or 2e arranged outside in a radial direction R and the outer passage 6a of the recess 2e or 2f arranged inside in a radial direction R of a respective pair of recesses 2d,2e and 2e,2f.

In one advantageous embodiment, as represented in FIG. 2, the plate valve 1 according to the invention comprises a valve seat 2 having seven recesses 2d-2k, which are spaced at intervals from one another in a radial direction R to the longitudinal axis L, wherein the valve seat 2 moreover comprises a plurality of passages 6 which, as shown in FIG. 3, are arranged spaced at regular intervals from one another along eight circles K1 . . . K8 running concentrically with the longitudinal axis L, wherein the circles K1 . . . K8 are arranged at intervals from one another in a radial direction to the longitudinal axis L. As shown in FIG. 3, the number of passages 6 arranged along the circles K1 . . . K8 may differ at least in some circles K1 . . . K8.

In one advantageous embodiment the passages 6, which are arranged at intervals from one another along the circles K1 . . . K8, have the same diameter.

In one advantageous embodiment passages 6 arranged in series in a radial direction R each have a different diameter.

The recesses 2c and therefore also the valve seat openings 2b advantageously have a maximum width of 5 mm in a radial direction to the longitudinal axis L.

The valve element 7 advantageously has a maximum lift in mm 0.6 times the width of the valve seat opening 2b in the direction of the longitudinal axis L.

The valve seat 2 advantageously has an overall height of at least 30 mm in the direction of the longitudinal axis L. Such a valve seat is preferably suited to pressures in the range from 50 to 1000 bar.

Figure 7:
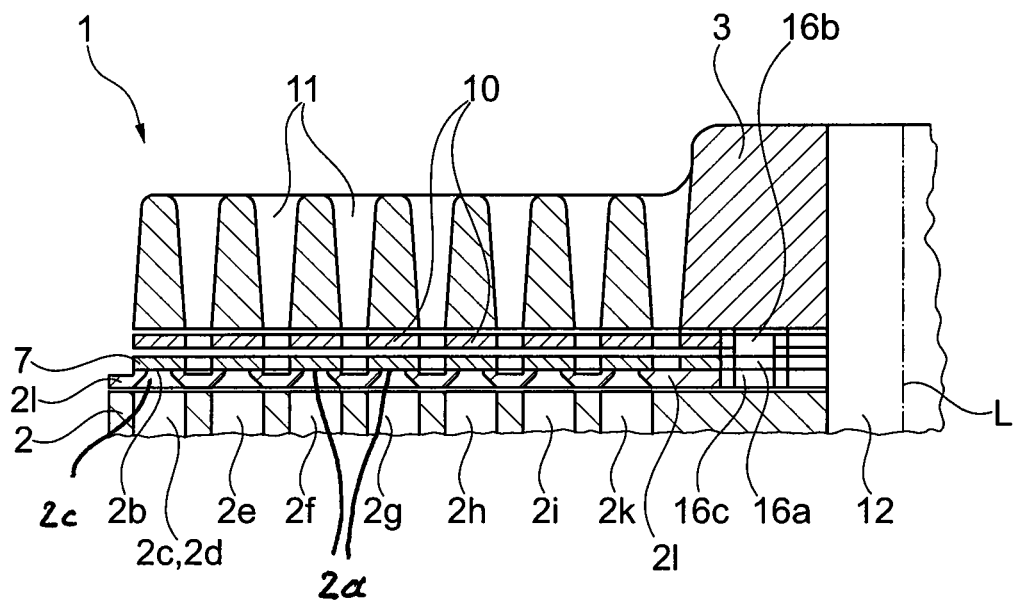
FIG. 7 a section through a further exemplary embodiment of a plate valve.

FIG. 7 in a longitudinal section shows a partial view of a further exemplary embodiment of a plate valve 1, in which the valve seat 2, in contrast to the exemplary embodiment according to FIG. 1, among other things comprises an additional end part 21 or a removable seat plate 21, which narrows the gap width of the valve seat opening 2a in the direction towards the valve guard 3. This end part 21 may be part of an integrally formed valve seat 2. The end part 21 is advantageously designed as a separate part, however, and arranged on the surface of the valve seat 2, and preferably fixed or detachably connected to the valve seat 2. One advantage of this embodiment is that the grooved recesses 2c . . . 2k of the valve seat 2 can be of greater or wider dimensions, but the valve seat 2 nevertheless has a narrow valve seat opening 2a at its outlet opening towards the valve element 7. This embodiment in particular affords cost-effective manufacture of the valve seat 2, since the recesses 2 . . . 2k are designed wider. In a further, advantageous embodiment the end part 21 has resilient properties, in order to damp the movement of an impinging valve element 7. In one advantageous embodiment guide springs are provided, for example a first guide spring 16a which is part of the valve element 7, a second guide spring 16b which is part of the damper plate 10 and a third guide spring 16c which is part of the end part 2k. The function of the guide spring is to guide the parts connected to them, particularly in the direction of the longitudinal axis L, and to hold the parts connected to them in a predefined position when at rest.

Figure 8:
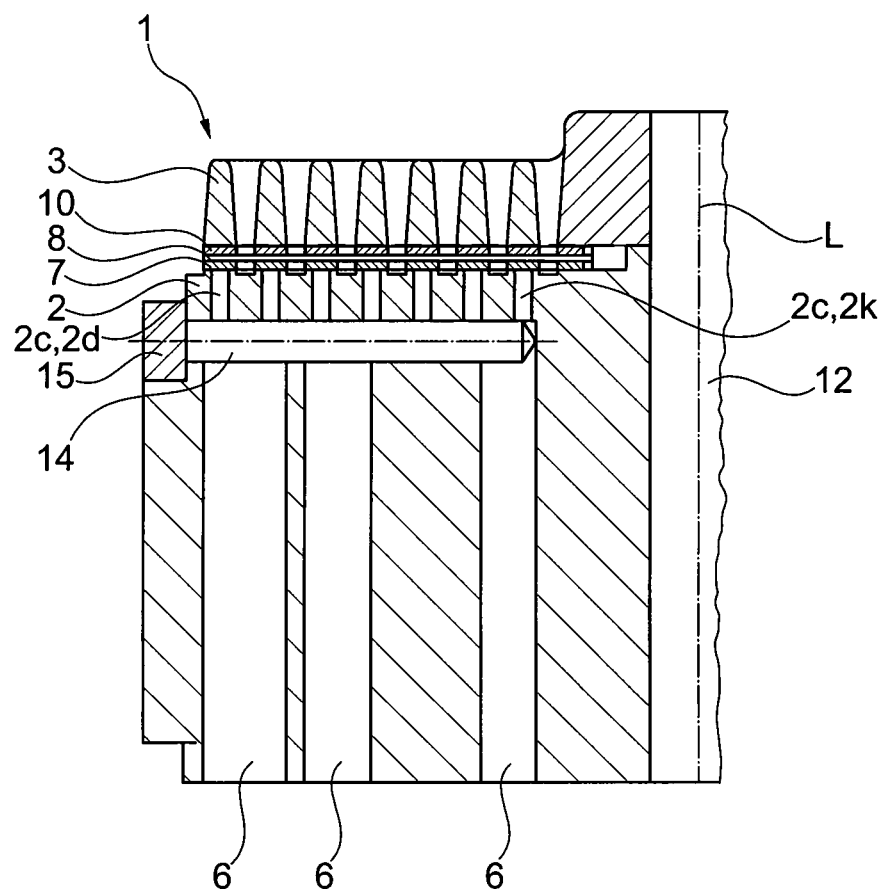
FIG. 8 a further longitudinal section through the first exemplary embodiment of the plate valve according to FIG. 1.

FIG. 8 in a longitudinal section shows a further exemplary embodiment of a plate valve 1, which has a relatively long valve seat 2 in the direction of the longitudinal axis L, which may be of solid design and is therefore suitable for high pressures ranging between 100 bar and 500 bar. The upper part comprising the guard 3, the damper plate 10, the valve element 7 and the end face of the valve seat 2 with valve seat openings 2a arranged therein is of identical design to the plate valve 1 represented in FIG. 1. A transverse bore 14 running vertically to the longitudinal axis L, which is sealed off from the outside by a cap 15, is arranged in the valve seat 2. The transverse bore 14 forms a fluid-conducting connection in a radial direction to the longitudinal axis L between the grooved valve seat openings 2a and possibly, as shown, also between the passages 6. This transverse bore 14 has the advantage that a more uniform flow distribution can be achieved in the area of the inlet into the valve seat opening 2a. A plurality of bores 14 may also be provided, which are arranged spaced at intervals from one another in a circumferential direction of the valve seat 2. The individual bores 14 may also be designed with different lengths, in order to afford some, but not all grooved recesses 2c and their valve seat openings 2a a fluid-conducting connection to one another. The bores 14 may run radially to the longitudinal axis L, but may also run in another direction, perpendicular to the longitudinal axis L.

Figure 9:
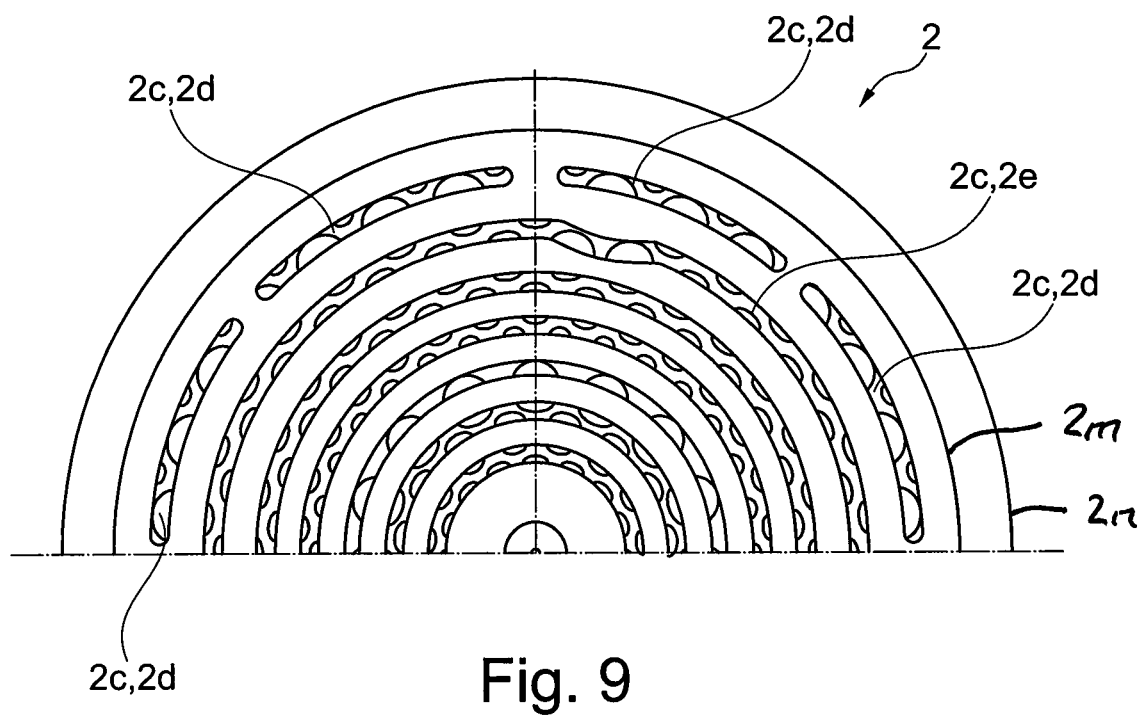
FIG. 9 a top view of a further exemplary embodiment of a valve seat of a plate valve.

FIG. 9 shows a top view of a further exemplary embodiment of a valve seat 2 of a plate valve. The valve seat 2, as represented in the longitudinal section in FIG. 4, comprises a first plate part 2m in the direction of the longitudinal axis L, in which the recesses 2c are arranged, and immediately following this in the longitudinal direction L a second plate part 2n, in which the passages 6 are arranged. The valve seat 2 is advantageously of one-piece design, comprising the first and second plate part 2m, 2n. This embodiment of the valve seat 2 has the advantage that the recesses 2c can be arranged in a variety of shapes and/or courses in the first plate part 2m, in such a way that these recesses 2c have a fluid-conducting connection to the passages 6. FIG. 9 shows recesses 2c, for example, which are designed to run as first recesses 2d along the periphery, wherein the first recesses 2d are of annular segmental design, so that the first recess 2d extends only over a partial angle, for example 40°, of the 360°, so that the valve seat 2 has no passage between each of the annular segments in a circumferential direction. The second recess 2e has, for example, a point at which the recess 2c does not run circularly but deviates slightly inwards in a radial direction towards the longitudinal axis L. The thereby widened point between the two recesses 2c could serve, for example, to locate a fastener which connects the valve seat 2 to the guard 3. The recesses 2c could be arranged in a variety of shapes and courses in the first plate part 2m, and might also run, for example, in a radial, zigzag, circular, or some other shape, wherein a valve element 7 of opposite design is naturally required which covers the profiles of the valve seat openings 2b defined by the course of the recesses 2c. This variety of shapes of the recesses 2c is possible because the second plate part 2n forms a basic structure, and the first plate part 2m is inserted behind this basic structure, wherein the first plate part 2m can be provided with recesses 2c in a plurality of possible shapes, in such a way that the recesses 2c are each connected to passages 6. The arrangement and shape of the recesses 2c and the arrangement and shape of the passages 6 can therefore as far as possible be formed largely independently of one another, provided that the passages 6 open into the recesses 2c and have a fluid-conducting connection to these. The first plate part 2m comprises the plurality of grooved recesses 2c, which form the valve seat openings 2b on the end face 2a, and the second plate part 2n comprises the plurality of passages 6, wherein a plurality of passages 6 in each case open into the same recess 2c, so that the a plurality of passages 6 have a fluid-conducting connection to the same valve seat opening 2b via the respective recess 2c.

The invention claimed is:

1. An automatic plate valve comprising:
a valve seat, a valve guard, a longitudinal axis (L) and a valve element arranged between the valve seat and the valve guard and movable back and forth in the direction of the longitudinal axis (L), wherein the valve seat comprises an end face having a plurality of valve seat openings oriented towards the valve guard, wherein the valve seat comprises a plurality of passages which have a fluid-conducting connection to the valve seat openings, wherein the valve element comprises at least one sealing element which has a sealing interaction with the valve seat openings, and wherein at least some of the passages have a different distance to the longitudinal axis (L) in a radial direction (R) to the longitudinal axis (L), wherein the end face of the valve seat comprises a plurality of grooved recesses, which form the valve seat openings on the end face, wherein the plurality of passages open into the same grooved recess, wherein the passages are fluidly connected to the same valve seat opening via the respective grooved recess, wherein at least some of the passages having the fluid-conducting connection to the same valve seat opening have different distances to the longitudinal axis (L).

2. The plate valve as claimed in claim 1, wherein the plurality of passages includes a plurality of outer passages and a plurality of inner passages which open into the respective recess are assigned to each of the recesses, wherein the outer passages are arranged along a first circle (K1) concentrically with the longitudinal axis (L) and spaced at intervals from one another in a circumferential direction, and wherein the inner passages are arranged along a second circle (K2) concentrically with the longitudinal axis (L) and spaced at intervals from one another in a circumferential direction, wherein the first circle (K1) and the second circle (K2) are spaced at an interval from one another in a radial direction.

3. The plate valve as claimed in claim 2, wherein that the outer passages and the inner passages run in the direction of the longitudinal axis (L), and that the outer passages and the inner passages are designed as bores.

4. The plate valve as claimed in claim 2, wherein the plurality of grooved recesses includes a first recess, a second recess and then a third recess, proceeding from the outside in a radial direction (R) towards the longitudinal axis (L), and that at least one outer passage and at least one inner passage opens into each of the recesses.

5. The plate valve as claimed in claim 4, wherein one of the plurality of passages which opens into both recesses of the respective pair of recesses, is arranged between each two pairs of recesses arranged in series in a radial direction (R) towards the longitudinal axis (L), wherein this passage forms both the inner passage of the recess arranged outside in a radial direction (R) and the outer passage of the recess arranged inside in a radial direction (R) of a respective pair of recesses.

6. The plate valve as claimed in claim 1, wherein the valve seat comprises an end part, the recesses of which narrow in a radial direction towards the valve guard in order to narrow the radial gap width of the valve seat opening in the direction towards the valve guard.

7. The plate valve as claimed in claim 6, wherein the end part is designed as a separate part and is arranged on a surface of the valve seat.

8. The plate valve according to claim 1, wherein that between two pairs of grooved recesses arranged one after the other in the radial direction (R) towards the longitudinal axis (L) there is in each case a passage which opens into both grooved recesses of the respective pair of grooved recesses.

9. The plate valve as claimed in claim 1, wherein the valve seat comprises a first plate part in the direction of the longitudinal axis (L) and immediately following this a second plate part, that the first plate part comprises the plurality of grooved recesses which form the valve seat openings on the end face, and the second plate part comprises the plurality of passages.

10. The plate valve as claimed in claim 1, wherein the passages are designed as circular ducts.

11. The plate valve as claimed in claim 1, wherein the passages open into the same recess at at least two different points in a radial direction relative to the longitudinal axis (L), both on an outer side of the recess relative to the longitudinal axis (L), and on an inner side of the recess relative to the longitudinal axis (L).

12. The plate valve as claimed in claim 1, wherein the recesses are designed as circular, annular or circular segmental grooves running concentrically with the longitudinal axis (L).

13. The plate valve as claimed in claim 1, wherein the valve seat comprises at least six circular valve seat openings, which are spaced at intervals from one another in a radial direction (R) to the longitudinal axis (L), that the plurality of passages are arranged spaced at intervals from one another along circles (K1-K7) running concentrically with the longitudinal axis (L), wherein the valve seat comprises at least seven circles (K1-K7) arranged spaced at intervals from one another in a radial direction to the longitudinal axis (L).

14. The plate valve as claimed in claim 1, wherein the passages have the same diameter.

15. The plate valve as claimed in claim 1, wherein the passages arranged in series in a radial direction (R) each have a different diameter.

16. The plate valve as claimed in claim 1, wherein the valve seat openings in a radial direction to the longitudinal axis (L) have a maximum width of 5 mm.

17. The plate valve as claimed in claim 1, wherein the valve element has a maximum lift 0.6 times the width of the valve seat opening in the direction of the longitudinal axis (L).

18. A method for operating an automatic plate valve comprising;
providing a valve seat, a valve guard, a longitudinal axis (L) and a valve element arranged between the valve seat and the valve guard and movable back and forth in the direction of the longitudinal axis (L), wherein the valve seat comprises a plurality of valve seat openings on an end face, wherein the valve seat openings are opened and closed by a movable valve element, wherein the end face of the valve seat comprises a plurality of grooved recesses, which form the valve seat openings on the end face, wherein a fluid (F) is delivered to the valve seat openings via a plurality of passages running in the valve seat and then via the grooved recesses, wherein that the fluid (F) is delivered to one of the grooved recesses and then to one of the valve seat openings through the grooved recesses spaced in a radial direction relative to the longitudinal axis (L).

* * * * *